(12) United States Patent
Jensen et al.

(10) Patent No.: US 10,275,952 B2
(45) Date of Patent: *Apr. 30, 2019

(54) SYSTEM FOR AUTOMATED RECORDING OF AIRCRAFT FLIGHT AND MAINTENANCE INFORMATION AND ASSOCIATED METHODS

(71) Applicant: SATCOM DIRECT, INC., Melbourne, FL (US)

(72) Inventors: James W. Jensen, Satellite Beach, FL (US); Colin Springer, Minneapolis, MN (US); Jason Natwick, Melbourne, FL (US); Darrell Herrera, Aurora, CO (US)

(73) Assignee: Satcom Direct, Inc., Melbourne, FL (US)

( * ) Notice: Subject to any disclaimer, the term of this patent is extended or adjusted under 35 U.S.C. 154(b) by 61 days.

This patent is subject to a terminal disclaimer.

(21) Appl. No.: 15/470,203

(22) Filed: Mar. 27, 2017

(65) Prior Publication Data

US 2017/0200328 A1    Jul. 13, 2017

Related U.S. Application Data

(63) Continuation of application No. 14/633,988, filed on Feb. 27, 2015, now Pat. No. 9,607,445.
(Continued)

(51) Int. Cl.
*G07C 5/00* (2006.01)
*G07C 5/08* (2006.01)
(Continued)

(52) U.S. Cl.
CPC .......... *G07C 5/008* (2013.01); *G06Q 10/20* (2013.01); *G07C 5/085* (2013.01); *G07C 5/0808* (2013.01);
(Continued)

(58) Field of Classification Search
CPC ...... G07C 5/085; G07C 5/008; G07C 5/0841; G07C 5/0808; G08G 5/0013;
(Continued)

(56) References Cited

U.S. PATENT DOCUMENTS

6,044,323 A * 3/2000 Yee et al. ........... H04B 7/18508
701/120
6,173,159 B1 * 1/2001 Wright et al. ..... H04B 7/18506
701/31.5
(Continued)

*Primary Examiner* — Dale W Hilgendorf
(74) *Attorney, Agent, or Firm* — Katten Muchin Rosenman LLP (57) ABSTRACT

A method for monitoring aircraft operation status comprising the steps of transmitting aircraft operation data from an on-board monitoring system of an aircraft while in a cruising phase of flight in at least one of a continuous transmission and a batched transmission while in flight and receiving aircraft operation data in the form of at least one of the continuous transmission and the batched transmission from the aircraft in flight, the form of the aircraft operation data being responsive to at least one of phase of flight, network traffic across a communication device associated with the aircraft, or network traffic across a network associated with the aircraft. The method further comprises identifying the aircraft associated with the aircraft operation data and recording the aircraft operation data to an aircraft database.

17 Claims, 5 Drawing Sheets

Related U.S. Application Data (60) Provisional application No. 61/945,526, filed on Feb. 27, 2014.

(51) Int. Cl.
   *G08G 5/00*      (2006.01)
   *H04B 7/185*     (2006.01)
   *G06Q 10/00*    (2012.01)
   *B64F 5/60*      (2017.01)

(52) U.S. Cl.
   CPC ......... *G07C 5/0841* (2013.01); *G08G 5/0013* (2013.01); *G08G 5/0052* (2013.01); *H04B 7/18506* (2013.01); *H04B 7/18508* (2013.01); *B64F 5/60* (2017.01)

(58) Field of Classification Search
   CPC .............. G08G 5/0052; H04B 7/18508; H04B 7/18506; G06Q 10/20; B64F 5/0045
   See application file for complete search history.

(56) References Cited

U.S. PATENT DOCUMENTS

| | | | | |
|---|---|---|---|---|
| 6,732,027 | B2 * | 5/2004 | Betters et al. | ....... G01C 23/005 |
| | | | | 701/31.4 |
| 6,839,614 | B1 * | 1/2005 | Timko et al. | .......... G07C 5/008 |
| | | | | 701/1 |
| 7,418,261 | B2 * | 8/2008 | Forbes et al. | .......... G07C 5/008 |
| | | | | 701/117 |
| 2003/0225492 | A1 * | 12/2003 | Cope et al. | ........ H04B 7/18506 |
| | | | | 701/33.4 |

* cited by examiner

Recent N651SD Flight Activity

| Date (UTC) | Route | Distance | Duration |
|---|---|---|---|
| 18-Feb-2014 2:09 UTC | KJYO: LEESBURG EXECUTIVE - KMLB: MELBOURNE INTL | 677 NM | 2.2 hrs |
| 17-Feb-2014 21:14 UTC | KMLB: MELBOURNE INTL - KJYO: LEESBURG EXECUTIVE | 677 NM | 1.8 hrs |
| 14-Feb-2014 1:04 UTC | KILG: NEW CASTLE - KMLB: MELBOURNE INTL | 739 NM | 2.4 hrs |
| 13-Feb-2014 22:48 UTC | CYUL: MONTREAL/PIERRE-ELLIOTT-TRUDEA - KILG: NEW CASTLE | 357 NM | 1.3 hrs |
| 13-Feb-2014 17:08 UTC | KILG: NEW CASTLE - CYUL: MONTREAL/PIERRE-ELLIOTT-TRUDEA | 357 NM | |
| 13-Feb-2014 13:18 UTC | KMLB: MELBOURNE INTL - KILG: NEW CASTLE | 739 NM | 1.9 hrs |
| 12-Feb-2014 20:38 UTC | KDAL: DALLAS LOVE - KMLB: MELBOURNE INTL | 885 NM | 2.6 hrs |
| 11-Feb-2014 17:37 UTC | KHDN: YAMPA VALLEY - KDAL: DALLAS LOVE | 677 NM | 1.9 hrs |

SYSTEM FOR AUTOMATED RECORDING OF AIRCRAFT FLIGHT AND MAINTENANCE INFORMATION AND ASSOCIATED METHODS

RELATED APPLICATIONS

This application claims priority under 35 U.S.C. § 119 of U.S. patent application Ser. No. 14/633,988 titled System for Automated Recording of Aircraft Flight and Maintenance Information and Associated Methods filed Feb. 27, 2015, which in turn claims the benefit under 35 U.S.C. § 119(e) of U.S. Provisional Patent Application Ser. No. 61/945,526 titled System for Automated Recording of Aircraft Flight and Maintenance Information and Associated Methods filed Feb. 27, 2014, the contents of which are incorporated herein in their entirety.

FIELD OF THE INVENTION

The present invention relates to systems and methods for providing real time flight log updates between an aircraft and a terrestrial network.

BACKGROUND OF THE INVENTION

Aircraft owners and operators maintain a variety of log books related to the use, operation and maintenance of aircraft and aircraft engines, systems and components. Such log books are maintained for numerous reasons and in numerous formats. For example, aircraft owners and operators keep track of the time that aircraft are operated in flight to track crew time. Crew time logging may be necessary (depending on the type of aircraft and purpose for which the aircraft is used) for safety reasons, to meet regulatory requirements, for labor and employment practices, to meet contract requirements, and for other reasons. Similarly, aircraft owners and operators may separately keep track of each occasion upon which an individual engine is started and how it is used. Such engine logging might include numerous parameters, such as length of time operated, temperatures at various points within an engine, fuel consumption, etc., and such information might further be used for a variety of purposes including safety analysis, contract or warranty documentation, business metrics, and others. The formats currently used to maintain the various logs for various purposes also vary widely, from manual entries on paper records to electronic records in differing formats, and sometimes vary even on the same aircraft. On some occasions, there are multiple records of the same event for the same aircraft, based on differing definitions for differing purposes. For example, the definition of "flight time" required to be used by one government agency for the purposes of crew scheduling may differ from a definition of "flight time" from a different government agency for the purposes of contract payment, even for the same flight on the same aircraft. In short, aircraft event logging is complex, multi-faceted and would benefit from coherent, accurate systemization.

There are a few services for keeping track of aircraft log books in use in the industry today. The majority require manual data entry at some point, even those that are not entirely manual paper records. Many systems require multiple people to maintain updates and enter the information in order to obtain a complete record of all desired data for a single flight. This may require extensive labor, and injects the possibility of human error in the recordings.

Previous systems to address this issue have utilized commonly used calculations to display the data accurately. This includes, but is not limited to, departure time, arrival time, cycles performed by various systems associated with the airplane (for example, the number of times landing gear is raised or lowered, the number of times an individual engine is started, or the number of times a pressurized aircraft hull is subjected to pressurization), and landings. In such a service, customers are provided an online subsystem to enter this information on their aircraft. The subsystem may be customized to a customer's needs, or not, and typically requires a subscription fee to operate.

An example of a prior art system is Rockwell Collins Ascend Flight Operations System (FOS®). A limitation with the Rockwell Collins service is the data has to be manually entered into the system. The information from the aircraft is retrieved or calculated manually at a ground station, processed, and configured to be viewed by the user. Such systems are inherently subject to human error in retrieving and recording accurate information for later input into the logging system, and may also suffer time delays from the recorded event to the time of logging, particularly when aircraft are operated far afield from robust support systems.

An automated reporting subsystem with accurate and real-time logs of aircraft reportable events that collect data from onboard aircraft systems and components anywhere in the world, which then transmits and collates that data using an Internet connection established through satellite communication, ground-based cellular network connections, or UHF/VHF/HF radio transmissions (alone or in combination) solves both the problems of human error and timeliness in reporting. The automated reporting subsystem may then transmit data that is collected and logged to one or more recipients, such as aircraft owners, operators, flight operations centers, maintenance organizations, regulatory agencies, and government agencies depending on the nature of the data and the needs of the aircraft owners or operators.

SUMMARY OF THE INVENTION

In some embodiments of the present invention, real-time and accurate aircraft log reports between an aircraft and a terrestrial computer network is presented. Additionally, the invention may provide an open architecture for disseminating this real-time information to other databases and services that aircraft operators use today. Furthermore, the invention is designed to remove or reduce manual entry and create more precise calculations to enable exact status about an aircraft anywhere in the world without the necessity for human intervention. This reduces labor hours and maintenance cycles on tracked rotable aircraft systems and components, such as engines. The invention may additionally either provide or incorporate the use of a ground-to-aircraft communications system that is fully independent and requires no additional hardware on the aircraft other than an already-existing network connection, such as an Internet connection. Furthermore, embodiments of the invention may provide an aircraft system that provides a real time cabin system with comprehensive features between aircraft and terrestrial networks on a global coverage basis.

A present embodiment of the invention includes a method for monitoring aircraft operation status that may comprise the steps of receiving aircraft operation data, identifying an aircraft associated with the aircraft operation data, and recording the aircraft operation data to an aircraft database. The method may further comprise the step of determining whether the aircraft operation data complies with rules governing aircraft operation. Upon determining the aircraft operation data complies with the rules governing aircraft operation, the method may include performing the step of recording the compliance to the aircraft database. Additionally, upon determining the aircraft operation data comprises a non-compliance, the method may include performing the steps of identifying a non-compliant aircraft system or component associated with the non-compliance, recording the non-compliance to the aircraft database, and performing an action responsive to the non-compliance.

In some embodiments, the method may further comprise the step of determining whether to transmit the aircraft operation data to an additional aircraft database. Additionally, in some embodiments, the method may further comprise the steps of determining whether to transmit the aircraft operation data to a user computerized device and, upon determining to transmit the aircraft operation data, transmitting the aircraft operation data to a user computerized device. Furthermore, in some embodiments, a user of the user computerized device may be associated with at least one of an aircraft owner, an aircraft operator, a flight operations center, a maintenance organization, a regulatory agency, a government agency, an engine original equipment manufacturer (OEM), and an avionics OEM.

In some embodiments, the method may further comprise the step of identifying the types of data comprised by the aircraft operation data. Additionally, the aircraft operation data may comprise at least one of take-off time, take-off location, landing time, landing location, speed, heading, altitude, flight time, engine operation time, engine operating parameters, landing gear position, landing gear cycles, hull pressurization, and fuel status. Furthermore, the method may further comprise the step of accessing a rules database comprising rules governing aircraft operation.

In some embodiments, the step of performing an action may comprise at least one of sending a message to the user computerized device, sending an alert to an aircraft, and sending an alert to a third party. Additionally, the step of receiving aircraft operation data may comprise at least one of receiving a continuous transmission and receiving a batched transmission. Furthermore, the step of receiving aircraft operation data by at least one of receiving a continuous transmission and receiving a batched transmission may be responsive to at least one of phase of flight, time of day, network traffic across a communication device associated with the aircraft, or network traffic across a network associated with the aircraft.

Further embodiments of the present invention are directed to a system for aircraft flight and maintenance monitoring comprising a terrestrial computerized device comprising processing circuitry, a non-transitory memory, and a communication device, a rules database comprising rules governing aircraft operation, and an aircraft database comprising data related to aircraft operation. The terrestrial computerized device may be positioned in communication with an on-board monitoring system of an aircraft via the communication device. Additionally, the terrestrial computerized device may be configured to receive aircraft operation data from the on-board monitoring system and record the aircraft operation data to the aircraft database. Furthermore, the terrestrial computerized device may be configured to access the rules governing aircraft operation and compare the rules to the aircraft operation data to determine if there is a non-compliance in the aircraft operation data. The terrestrial computerized device may be configured to, upon a determination the aircraft operation data comprises a non-compliance identify a non-compliant aircraft system or component associated with the non-compliance, record the non-compliance to the aircraft database, and perform an action responsive to the non-compliance.

In some embodiments, the aircraft database may be accessible by a user computerized device. Furthermore, the terrestrial computerized device may be configured to transmit the aircraft operation data to at least one of an additional aircraft database and a user computerized device. Additionally, the action performed by the terrestrial computerized device may be at least one of send a message to the user computerized device, send an alert to an aircraft, and send an alert to a third party. The terrestrial computerized device is configured to receive the aircraft operation data by either a continuous transmission and a batch transmission.

Further aspects of this invention will be apparent from the following detailed description of embodiments which are illustrated schematically in the accompanying drawings.

DETAILED DESCRIPTION OF THE INVENTION

The present invention will now be described more fully hereinafter with reference to the accompanying drawings, in which preferred embodiments of the invention are shown. This invention may, however, be embodied in many different forms and should not be construed as limited to the embodiments set forth herein. Rather, these embodiments are provided so that this disclosure will be thorough and complete, and will fully convey the scope of the invention to those skilled in the art. Those of ordinary skill in the art realize that the following descriptions of the embodiments of the present invention are illustrative and are not intended to be limiting in any way. Other embodiments of the present invention will readily suggest themselves to such skilled persons having the benefit of this disclosure. Like numbers refer to like elements throughout.

Although the following detailed description contains many specifics for the purposes of illustration, anyone of ordinary skill in the art will appreciate that many variations and alterations to the following details are within the scope of the invention. Accordingly, the following embodiments of the invention are set forth without any loss of generality to, and without imposing limitations upon, the claimed invention.

In this detailed description of the present invention, a person skilled in the art should note that directional terms, such as "above," "below," "upper," "lower," and other like terms are used for the convenience of the reader in reference to the drawings. Also, a person skilled in the art should notice this description may contain other terminology to convey position, orientation, and direction without departing from the principles of the present invention.

Furthermore, in this detailed description, a person skilled in the art should note that quantitative qualifying terms such as "generally," "substantially," "mostly," and other terms are used, in general, to mean that the referred to object, characteristic, or quality constitutes a majority of the subject of the reference. The meaning of any of these terms is dependent upon the context within which it is used, and the meaning may be expressly modified.

An embodiment of the invention, as shown and described by the various figures and accompanying text, provides a system for automatically collecting, collating, and transmitting data related to the operational status of various systems and components associated with an aircraft to a terrestrial computerized device, recording the data, and analyzing the data to determine if the data indicates any action to be taken responsive thereto.

Figure 1:
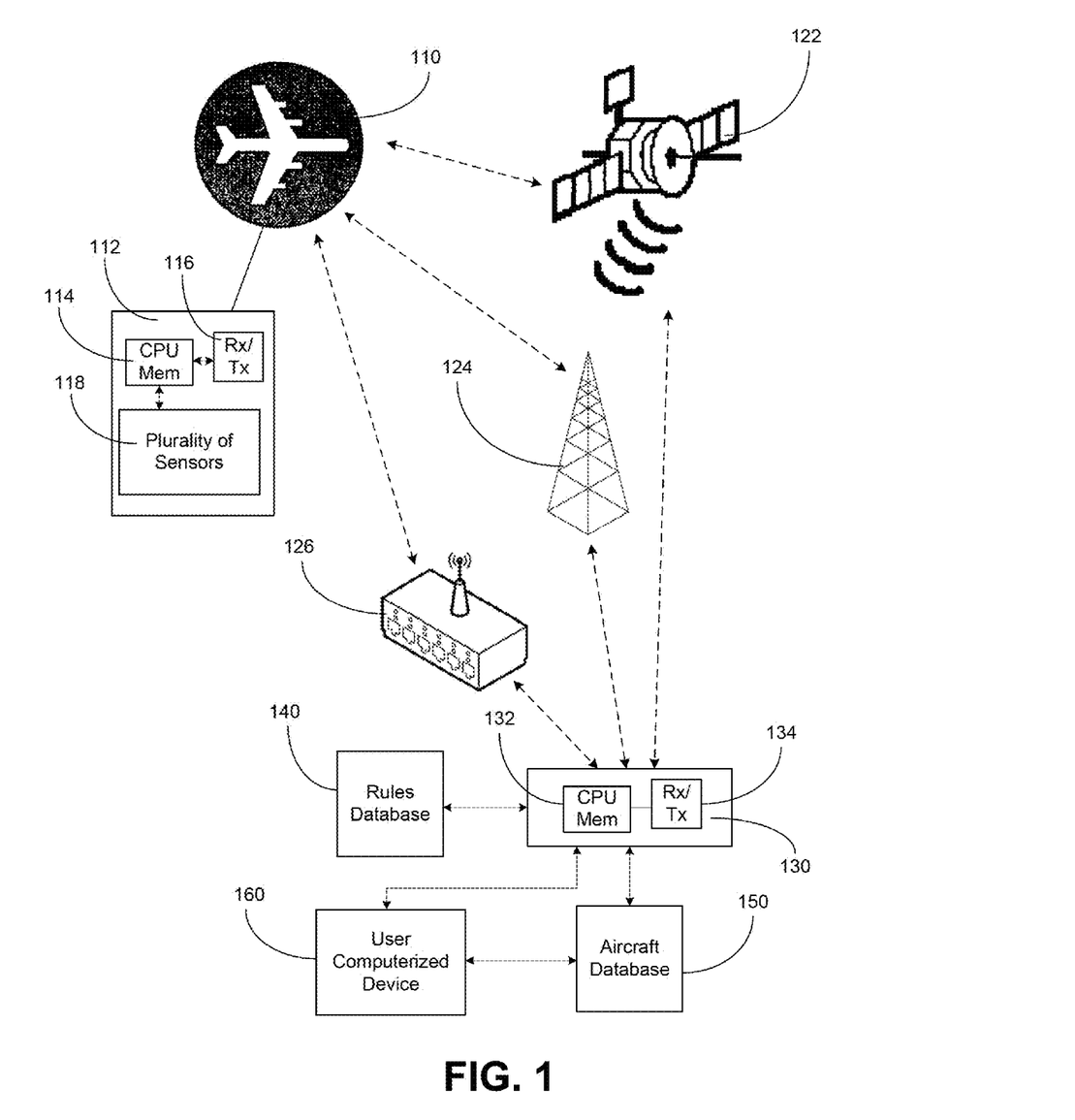
FIG. 1 is an environmental view of a system for communicating real-time aircraft log reports between an aircraft and a terrestrial computer network according to an embodiment of the invention.

Referring now to FIG. 1, a schematic view of an embodiment of the invention is presented. In the present embodiment, an aircraft 110 may include a on-board monitoring system 112. The on-board monitoring system 112 may be configured to monitor both the operation and the status of various components and systems of the aircraft 110. Such monitoring systems 112 are known in the art, including, but not limited to, a flight management system (FMS), an electronic centralized aircraft monitor (SCAM) system, an Engine Indicating and Crew Alerting System (EICAS), a Flight Data Acquisition Unit (FDAU), a Data Management Unit (DMU), and a Global Positioning System (GPS) device. Moreover, the on-board monitoring system 112 may be configured to provide data relevant to the operation and status of any system or component associated with the aircraft 110, or any other information relevant to the operation of the aircraft 110, including, but not limited to, some or all of the following data: take-off time, take-off location, landing time, landing location, speed, heading, altitude, flight time, engine operation time, engine operating parameters, landing gear position and cycles, hull pressurization, fuel status, and any other type of information that is relevant to the operation of an aircraft 110.

The on-board monitoring system 112 may comprise processing circuitry 114 including one or more processing units (labeled in FIG. 1 as a central processing unit (CPU)) and memory, including non-volatile memory configured to have stored thereon non-transitory signals and data. The on-board monitoring system 112 may further include a communication device 116 configured to transmit and receive data using at least one communication means or method. Communication methods employed by the communication device 116 may include any type of wireless communication as is known in the art, including all types of radio transmission, including satellite communication, ground-based cellular network connections, or UHF/VHF/HF radio transmissions, as well as any other type of radio communication as is known in the art. Furthermore, in some embodiments, the communication device 116 may be configured to transmit and receive data using at least one mode of light communication, including visible light communication (VLC), laser communication, and the like, and acoustic communication. The above-provided means and methods of communication are exemplary only, and all types of wireless communication are contemplated and included within the scope of the invention. Furthermore, the communication device 116 may include components necessary to enable the various methods of communication. In the present embodiment, the communication device 116 may be configured to communicate with at least one of a satellite network 122, a terrestrial cellular communication network 124, and other radio-based communication networks 126.

The on-board monitoring system 112 may further comprise a plurality of sensors 118 configured to monitor the operation and/or status of various aircraft systems and components. The plurality of sensors 118 may include sensors of any type, including those necessary for effectively monitoring the operation and/or status of various aircraft systems and/or components. Any type of sensor as is known in the art is contemplated and included within the scope of the invention for the effective monitoring of the various systems and components of the aircraft 110.

The processing circuitry 114 of the on-board monitoring system 112 may be configured to receive, organize, and concatenate data received from the plurality of sensors 118. More specifically, the processing circuitry 114 may be configured to store data received from the plurality of sensors 118 on a memory associated with the processing circuitry 114. In some embodiments, the processing circuitry 114 may be configured to perform batched communication, sending data sets comprising data received from the plurality of sensors 118 across a span of time at once via the communication device 116. In some embodiments, the processing circuitry 114 may be configured to perform continuous transmission of the data received from the plurality of sensors 118 via the communication device 116. It is contemplated that the processing circuitry 114 may be configured to perform both types of communication, namely batched and continuous, and may select one over the other responsive to one or more factors. Factors considered may include, but are not limited to, phase of flight (i.e. takeoff, landing, ascent, descent, cruising), time of day, network traffic across the communication device 116, network traffic across any of the satellite network 122, the terrestrial cellular network 124, and the radio network 126.

Additionally, the processing circuitry 114 may be configured to selectively transmit data received from the plurality of sensors 118. For example, a first set of data may be unnecessary to be transmitted during various phases of the flight, as identified above, and may be delayed until such time as is appropriate to transmit. This example is exemplary only, and the processing unit may be configured to selectively transmit subsets of data using the factors provided hereinabove.

In some embodiments, at least one of the processing circuitry 114 and the communication device 116 may be configured to transmit an identifier along with the data so as to associate the data with the aircraft 110. Any device that receives the data transmitted by the communication device 116 may be configured to interpret the identifier so as to accurately associate the data with the aircraft 110.

The on-board monitoring system 112 may be positioned in communication with a terrestrial computerized device 130 via the communication device 116, more specifically, via the connection between the communication device 116 and a network the communication device 116 is connected thereto, such as, for example, in the present embodiment, at least one of the satellite network 122, the terrestrial cellular communication network 124, or any other radio communication network 126.

The terrestrial computerized device 130 may be configured to receive and store data received from the on-board monitoring system 112. Furthermore, the terrestrial computerized device 130 may be configured to analyze data received from the on-board monitoring system 112 and perform an action responsive to the outcome of the analysis.

The terrestrial computerized device 130 may include a processing circuitry 132 that may comprise a processing unit and memory associated therewith, the memory including non-volatile memory configured to have stored thereon non-transitory signals and data. The terrestrial computerized device 130 may further include a communication device 134. The communication device 134 of the terrestrial computerized device 130 may be configured to communicate using the same communication means or method as the communication device 116 of the aircraft 110, and accordingly may be configured to include the attending components necessary to accomplish such communication.

The terrestrial computerized device 130 may further be positioned in communication with a rules database 140. The rules database 140 may include rules related to the data received from the on-board monitoring system 112. More specifically, the rules database 140 may include rules that may be accessed by the terrestrial computerized device 130 and may be utilized by the terrestrial computerized device 130 in analyzing data received from the on-board monitoring system 112. The rules database 140 may include rules related to the various systems and components of the aircraft 110, including, but not limited to operational ranges, cycle limits, time of operation limits, and the like. In some embodiments, the rules database 140 may be an integral part of the terrestrial computerized device 130.

In some embodiments, the terrestrial computerized device 130 may be positioned in communication with an aircraft database 150. The aircraft database 150 may be configured to have stored thereon data received from the aircraft 110 including, but not limited to, some or all of the following data: take-off time, take-off location, landing time, landing location, speed, heading, altitude, flight time, engine operation time, engine operating parameters, landing gear position and cycles, hull pressurization, fuel status, and any other type of information that is relevant to the operation of the aircraft 110. Moreover, the aircraft database 150 may be configured to have stored thereon data received from aircraft other than the aircraft 110. The data may be stored on non-volatile memory in a non-transitory condition, such that the data may be preserved permanently and/or indefinitely and may be accessible by the terrestrial computerized device 130. The data stored on the aircraft database 150 may include data received from the aircraft 110 during the present flight, as well as data received from previous flights. In some embodiments, the aircraft database 150 may be an integral part of the terrestrial computerized device 130.

In some embodiments, the terrestrial computerized device 130 may be configured to determine whether to transmit the data received from the aircraft to additional aircraft databases. This may be in order to provide redundancy or to provide information to independently operated aircraft databases. Furthermore, the terrestrial computerized device 130 may be configured to transmit differing subsets of information to the different aircraft databases. The determination to transmit the data to an additional aircraft database may be made and acted upon in real-time.

In some embodiments, at least one of the terrestrial computerized device 130 and the aircraft database 150 may be positioned in communication with a user computerized device 160. The user computerized device 160 may be configured to, in some embodiments, receive information from the terrestrial computerized device 130 related to the operation and/or status of systems and components of the aircraft 110, hereinafter referred to as aircraft operation data, including, for example, that a system or component needs repair or replacement. Correspondingly, the terrestrial computerized device 130 may be configured to transmit the aircraft operation data in real-time, such that the user of the user computerized device 160 may receive real-time information regarding the status of the various systems and components of the aircraft 110. Such early access to the aircraft operation data may advantageously enable the user to order the repair or replacement of the systems and components at the earliest opportunity. The information may be delivered and/or received by the user computerized device 160 at any time, including during flight of the aircraft 110 and at some time after. Furthermore, in some embodiments, the user computerized device 160 may be configured to communicate with the aircraft database 150. Reasons for such communication may include, but are not limited to, investigation desired to be performed by the user. The user computerized device 160 may be any computerized device as is known in the art, including, but not limited to, personal computers, including desktop and notebook computers, computer terminals, tablet/slate devices, smart phones, and the like. Moreover, the data stored on the aircraft database 150 may be accessible by use of Internet browsing software and presented in the form of a web page, by use of an application configured specifically for the retrieval, transmittal, and display of information associated with the aircraft database 150, and by any other means and methods as are known in the art.

Figure 2:
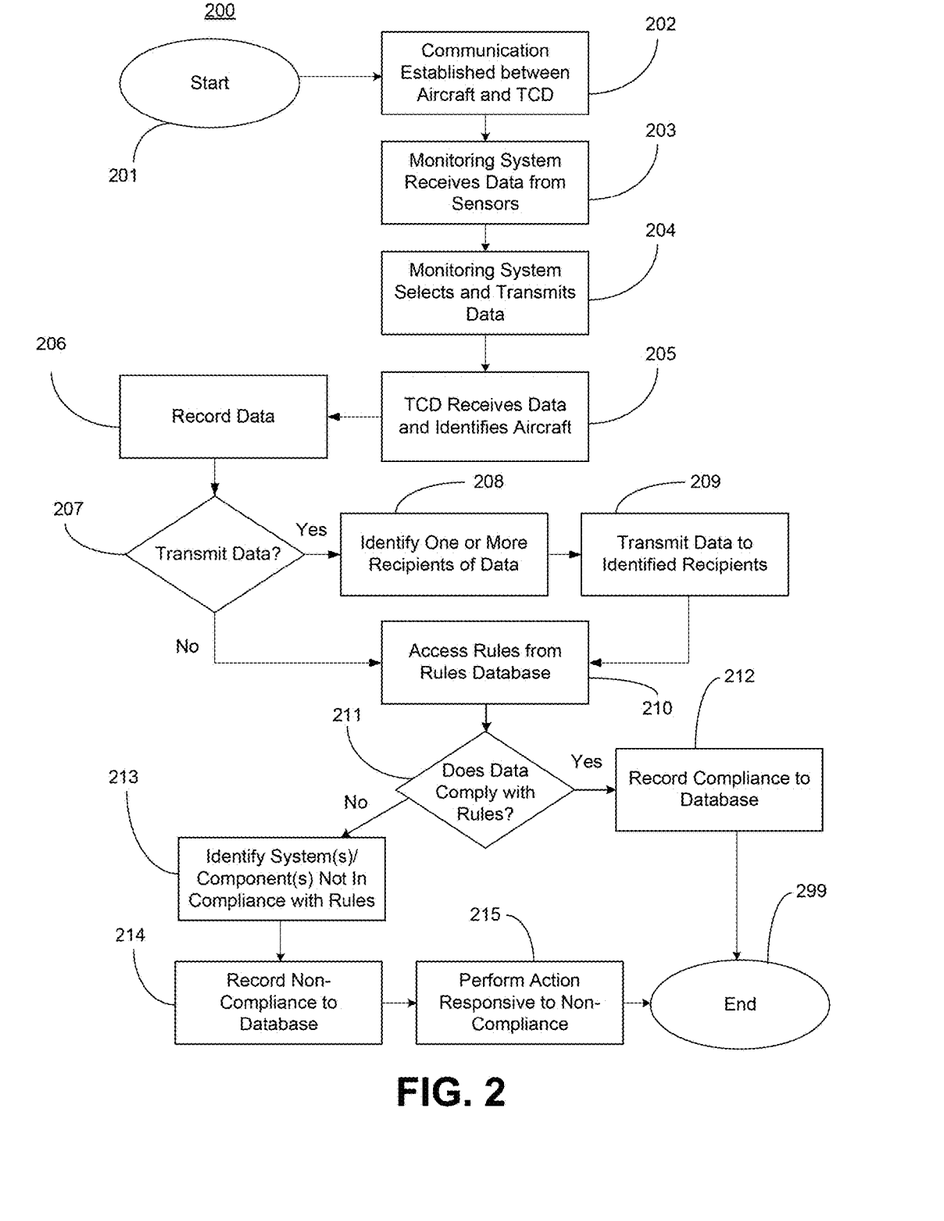
FIG. 2 is a flow chart illustrating a method of recording and monitoring the status of various systems and components of an aircraft according to an embodiment of the invention.

Referring now to FIG. 2, a flowchart 200 illustrating a method of monitoring the status of systems and components associated with an aircraft is presented. Beginning at Block 201, at Block 202 communication may be established between the aircraft and the terrestrial computerized device. At Block 203 the on-board monitoring system may receive data from the plurality of sensors configured to provide data related to the aircraft's systems and components. At Block 204, the on-board monitoring system may select and transmit data based upon the factors recited hereinabove.

Continuing at Block 205, the terrestrial computerized device may receive and identify the aircraft from which the data was transmitted. At Block 206, the terrestrial computerized device may record the data to a file associated with the aircraft form which the data was transmitted. For example, the data may be recorded onto an aircraft database as described hereinabove. Furthermore, the terrestrial computerized device may access data previously stored on the aircraft database associated with the aircraft from which the data was received. Additionally, the data may be recorded onto a memory associated with the terrestrial computerized device.

At Block 207, the terrestrial computerized device may determine if the data received from the aircraft should be transmitted to another recipient such as aircraft owners, operators, flight operations centers, maintenance organizations, regulatory agencies, government agencies, engine OEMs, and avionics OEMs. The terrestrial computerized device may be configured to identify the different types of data received from the aircraft, more specifically, to identify which system or component of the aircraft is related to the data, or to identify the information conveyed by the data as it relates to the aircraft. Types of data may include, but are not limited to, some or all of the following information: take-off time, take-off location, landing time, landing location, speed, heading, altitude, flight time, engine operation time, engine operating parameters, landing gear position and cycles, hull pressurization, fuel status, and any other type of information that is relevant to the operation of an aircraft.

If it is determined at Block 207 that the data is to be transmitted, the terrestrial computerized device may identify one or more recipients of the data at Block 208. Potential recipients of the data include, but are not limited to, any of the following: aircraft owners, operators, flight operations centers, maintenance organizations, regulatory agencies, and government agencies. The identification of the recipients will be determined based on the nature of the data received. At Block 209, the terrestrial computerized device may transmit the data to the identified recipients. The data may be transmitted in approximately real-time, immediately upon the determination of the recipient. The terrestrial computerized device may transmit the data in any format and by any method by which the recipients may receive the data. In some embodiments, the terrestrial computerized device may retransmit the data as received from the aircraft to the recipient. In some embodiments, the terrestrial computerized device may reformat the data into the form of a log, and then transmit the log to the recipient. Additionally, the terrestrial computerized device may transmit the data by any method known in the art, including, but not limited to, transmitting the data across a network, such as the Internet or any other network as is known in the art, in any format as described hereinabove, by facsimile telecommunication, and the like. The method may then proceed to Block 210

If it is determined at Block 207 that the data is not to be transmitted, then the method may proceed to Block 210

At Block 210, the terrestrial computerized device (TCD) may access the rules database and retrieve those rules relevant to the data received at Block 205. At Block 211, the terrestrial computerized device may apply the rules to at least one of the data received from the aircraft at Block 204 and, if applicable, the data accessed from the aircraft database, to determine if the data complies with the rules. If it is determined at Block 211 that the data complies with the rules, such compliance may be recorded at Block 212, and the method may end at Block 299.

If it is determined at Block 211 that the data does not comply with the rules, then at Block 213 the terrestrial computerized device may identify the system(s)/component(s) that do not comply with the rules. At Block 214, the non-compliance may be recorded to at least one of the aircraft database and the memory associated with the terrestrial computerized device. At Block 215 the terrestrial computerized device may perform an action responsive to the non-compliance. Such actions may include performing an alert, such as sending a message to a computerized device, such as the user computerized device 160 of FIG. 1. The content of the message may be anything that may convey the nature of the non-compliance. In some embodiments, the message may further include proposed remediation, such as inspection of the relevant system/component, replacement of the relevant system/component, or a repair of the relevant system/component. In some embodiments, the alert may be sent to the aircraft 110 for receipt by the pilot or other crewmember of the aircraft 110. In some embodiments, the alert may be sent to a third party, including, but not limited to, any of a maintenance organization, a manufacturer, an operator, and the like. Furthermore, the information related to the alert may be included in the alert for additional review and analysis. In some embodiments, the action may be automatically adjusting the operation of the aircraft 110 to alleviate, remedy, correct, or otherwise address the non-compliance. The method may then end at Block 299.

Referring now to FIGS. 3-6, an additional aspect of the invention will now be discussed. With specific reference to the terrestrial computerized device 130 and the aircraft database 150 as shown in FIG. 1, the recordation, logging, and enabling accessibility of information related to an aircraft will now be discussed. As discussed hereinabove, the information stored on the aircraft database 150 may be accessible to a user computerized device 160. Moreover, at least one of the terrestrial computerized device 130 and the aircraft database 150 may be configured to provide access to the information, or subsets thereof, to the user computerized device 160. Additionally, all the information discussed below, specifically the elements of the various pages described herein below, may be understood to be data that is accessible from the aircraft database 150 and may be propagated into the relevant elements of the various pages. Furthermore, in some embodiments, the information that is either generated by the terrestrial computerized device 130 or input by a user may be storable on the aircraft database 150. Additionally, while the foregoing figures present information in the format of a website page that is accessible by the Internet using web browsing software, it is contemplated and included within the scope of the invention that the same information may be accessible and provided by any other means in art, including an application written and formatted specifically for performance on a particular device or class of devices, such as the user computerized device 160 as described hereinabove.

Figure 3:
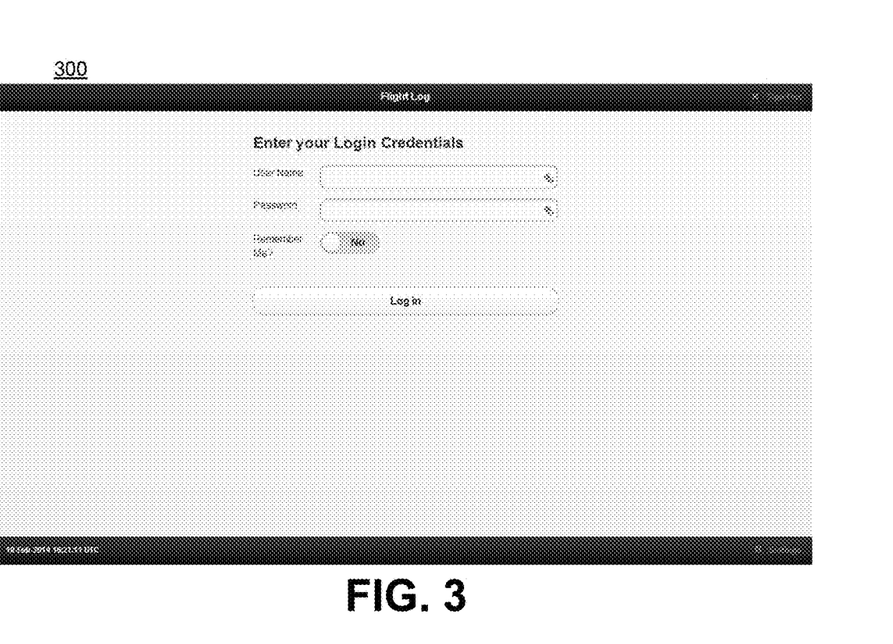
FIG. 3 is a login website page according to an embodiment of the invention.

Referring now specifically to FIG. 3, a login page 300 is presented. The login page 300 gives a user of the user computerized device 160 to provide credentials to grant access to the aircraft database 150. The provision and confirmation of login credentials is known in the art, generally. The login credentials provided will grant access to the user to information contained on the aircraft database 150, the information to which access is granted being either all the information on the database or a subset of that information. The types of subsets of information may vary, including, but not limited to, subsets of aircraft, being defined as a fleet, and the type of information regarding a specific aircraft, including, but not limited to, some or all of the following data: take-off time, take-off location, landing time, landing location, speed, heading, altitude, flight time, engine operation time, engine operating parameters, landing gear position and cycles, hull pressurization, fuel status, and any other type of information that is relevant to the operation of an aircraft. The type of information for which access is granted may be characterized according to the nature of the user, more specifically what their relationship is to the aircraft associated with the login credentials. Types of users include, but are not limited to, FMS software companies, engine manufacturers, aircraft manufacturers, aircraft leasing companies, maintenance companies, aircraft operating companies, regulatory entities, government agencies, and the like. The types of users provided herein are exemplary only, and all types of users seeking information stored on the aircraft database are contemplated and included within the scope of the invention.

Figure 4:
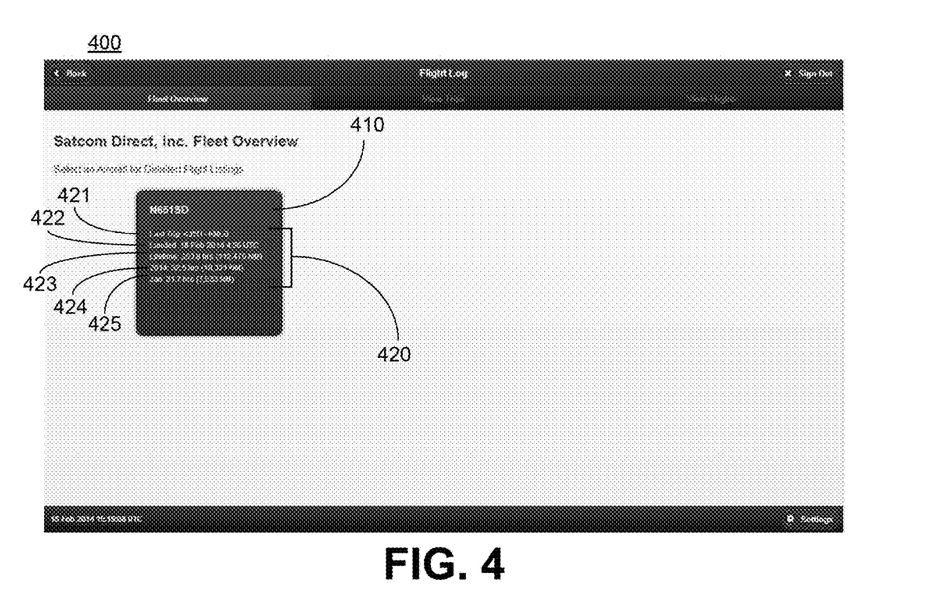
FIG. 4 is a fleet overview website page according to an embodiment of the invention.

Referring now specifically to FIG. 4, a fleet overview page 400 is presented. On the fleet overview page 400, each aircraft 410 that is associated with the credentials provided in the login page 300 may be displayed. Aircraft 410 may be identified by any sufficient differentiating factors, including tail number. Additionally, information 420 related to each aircraft 410 associated with the login credentials may be provided. The content of the information 420 that is presented may depend on the credentials that are provided. In the present depiction of the present embodiment, the information 420 includes the last trip completed by the aircraft (as indicated by airport code) 421, the time the aircraft landed most recently 422, the lifetime operating time and distance 423, the operating time and distance for a given time period, in this depiction the year 2014 424, and more specifically, January 2014 425. The present depiction is exemplary only, and more or less information may be provided.

Figure 5:
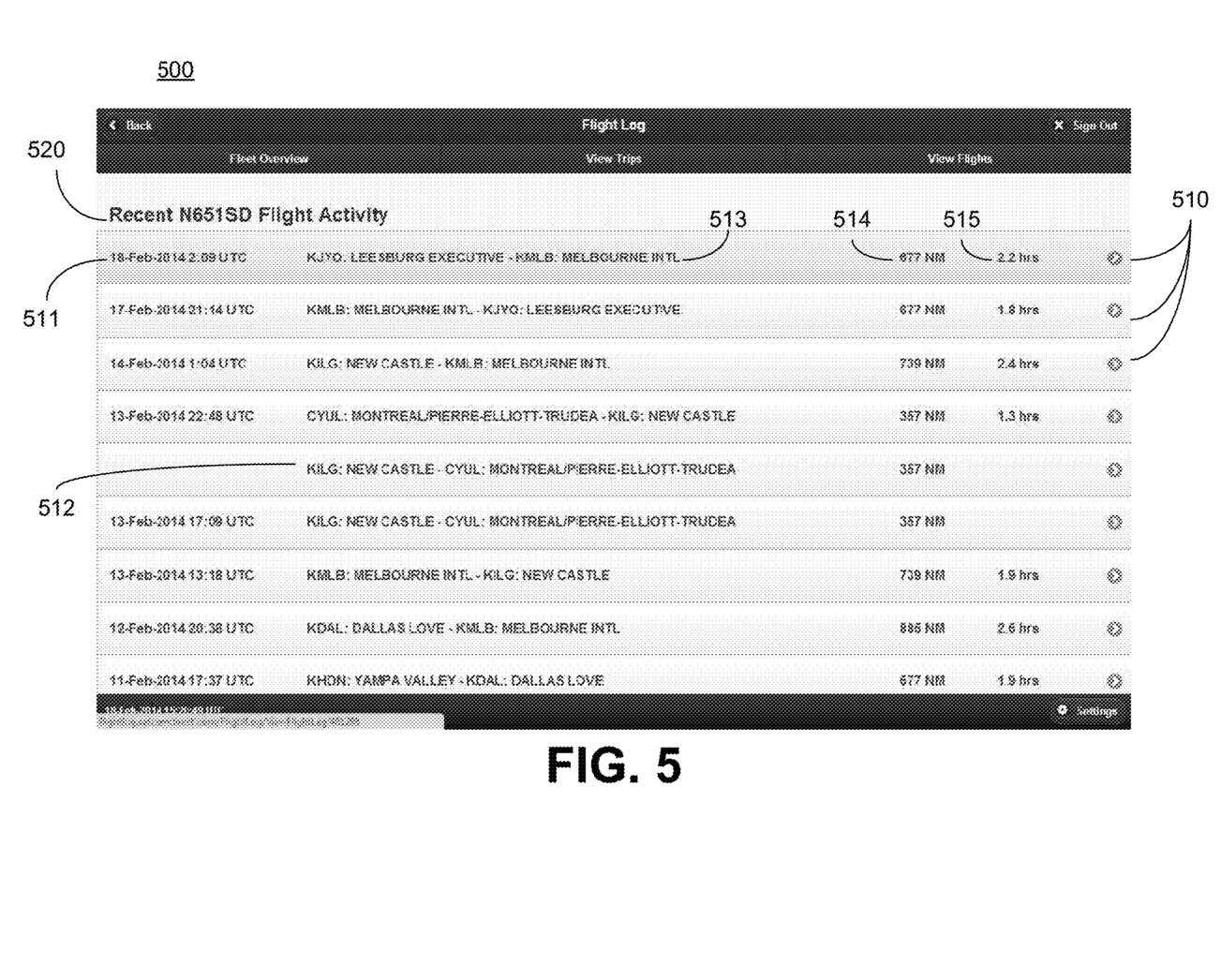
FIG. 5 is a flight activity website page according to an embodiment of the invention.

Referring now to FIG. 5, a flight activity page 500 is presented. The flight activity page 500 may include information related to individual flights 510 associated with an aircraft 520. Additionally, each individual flight 510 may have displayed therewith information related to the flight, including, but not limited to, take-off time 511, take-off airport 512, landing airport 513, distance traveled 514, and flight time 515. The present depiction is exemplary only, and more or less information may be provided.

Figure 6:
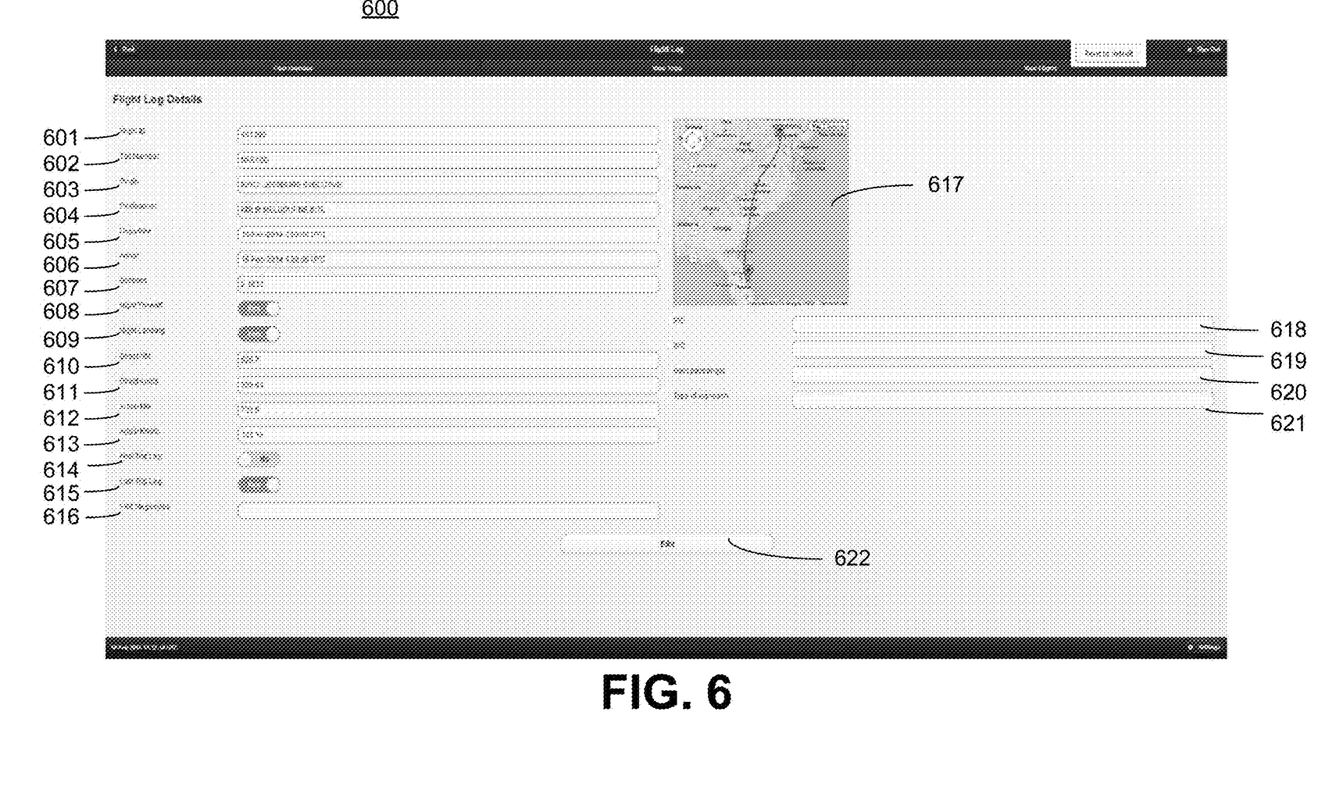
FIG. 6 is a flight leg information website page according to an embodiment of the invention.

Referring now to FIG. 6, a flight leg details page 600 is presented. The flight leg details page 600 may present information related to a particular flight performed by an aircraft. As can be seen, the type of information included in the flight leg details page 600 is varied, potentially including, but not limited to, flight ID 601, aircraft tail number 602, origin/take-off airport 603, destination/landing airport 604, departure 605, arrival 606, flight duration 607, an indication as to whether the take-off occurred at night 608, an indication as to whether the landing occurred at night 609, a calculation of the direct distance 610 between the origin 603 and the destination 604, a calculation of the direct speed 611 of the aircraft along the calculated distance between the origin 603 and the destination 604, the actual distance 612 traveled by the aircraft, the actual speed 613 of the aircraft, an indication as to whether the flight was the first leg of a trip 614, an indication as to whether the flight was the last leg of a trip 615, an indication of the quantity of data 616 transmitted and received by the aircraft during the flight (here abbreviated "SBB" for "SwiftBroadband"), a map indicating the flight path of the aircraft 617, the Pilot in Command ("PIC") 618, the Second in Command ("SIC") 619, the main passenger onboard the aircraft during the flight 620, and the type of approach made in landing 621. Each of the elements of the flight leg details page 600 may have associated therewith a text field or toggle to convey the information.

As stated hereinabove, each of the direct distance 610 and the direct speed 611 may be calculated based on information received from the aircraft 150. More specifically, the direct distance 610 may be calculated from the distance between the origin 603 and the destination 604. The calculation may be based on known locations of the origin 603 and the destination 604, GPS coordinates of the aircraft at take-off and landing, or any other means in the art. The direct speed 611 may be calculated from the direct distance 610 and the flight duration 607.

Additionally, in some embodiments, each of the origin 603 and the destination 604 may be automatically determined. In such embodiments, GPS coordinates may be received from the aircraft 110, and airports, airfields, or other locations relevant to aviation may be determined from the coordinates, and those locations may be propagated into the fields associated with the origin 603 and the destination 604. The determination may be made by the terrestrial computerized device 130.

Additionally, each of the flight duration 607, actual distance traveled 612, and actual speed 613 may be automatically determined, based on at least one of GPS information, time difference in departure and arrival, airspeed information, and any other information from which the relevant elements may be determined. The determination may be made by the terrestrial computerized device 130.

Additionally, each of the night take-off indication 608 and night landing indication 609 may be automatically determined. In such embodiments, the terrestrial computerized device 130 may determine a sunset time associated with either of the origin and destination and further associated with a date included in the departure 605 and arrival 606. Once the sunset times have been determined, the computerized device 130 may then determine whether either of the take-off and landing occurred thereafter, respectively. Then, each of the night take-off indication 608 and night landing indication 609 may be set to convey the determination made as to whether they occurred after sunset. Additionally, in some embodiments, the indication may require that the take-off or landing occur a certain amount of time after sunset, and as such the computerized device 130 may determine whether either of the take-off or landing occurred after the amount of time required after sunset. In some embodiments, that amount of time may be one hour, such that night is defined as beginning one hour after sunset.

Additionally, the map indicating the flight path of the aircraft 617 may be automatically created. The map 617 may be based on at least one of GPS information and speed and heading information received from the aircraft, with the information being overlaid onto a map in a visual representation to depict the flight path.

In some embodiments, certain elements of the flight leg details page 600 may be editable, and others may not. In the present embodiment, the flight leg details page includes an Edit button 622. Upon activating the editing feature of the flight leg details page 600, a user may be able to add, change, or remove information therefrom. In some embodiments, all of the elements may be editable. In some embodiments, only some of the elements may be editable. In other embodiments, a default value or indication may be provided that may then be edited by a user, as described hereinabove.

Additionally, in some embodiments, all the information presented on the flight leg details page 600 may be confirmed by a user. In such embodiments, an on-screen prompt for the user to confirm the accuracy of the information contained within the elements of the flight leg details page 600 may be presented to a user. In some embodiments, where new information is either propagated into the elements of the flight leg details page 600 or is input by the user, the information will not be recorded to the aircraft database 150 until such confirmation is received from the user.

Some of the illustrative aspects of the present invention may be advantageous in solving the problems herein described and other problems not discussed which are discoverable by a skilled artisan.

While the above description contains much specificity, these should not be construed as limitations on the scope of any embodiment, but as exemplifications of the presented embodiments thereof. Many other ramifications and variations are possible within the teachings of the various embodiments. While the invention has been described with reference to exemplary embodiments, it will be understood by those skilled in the art that various changes may be made and equivalents may be substituted for elements thereof without departing from the scope of the invention. In addition, many modifications may be made to adapt a particular situation or material to the teachings of the invention without departing from the essential scope thereof. Therefore, it is intended that the invention not be limited to the particular embodiment disclosed as the best or only mode contemplated for carrying out this invention, but that the invention will include all embodiments falling within the scope of claims. Also, in the drawings and the description, there have been disclosed exemplary embodiments of the invention and, although specific terms may have been employed, they are unless otherwise stated used in a generic and descriptive sense only and not for purposes of limitation, the scope of the invention therefore not being so limited. Moreover, the use of the terms first, second, etc. do not denote any order or importance, but rather the terms first, second, etc. are used to distinguish one element from another. Furthermore, the use of the terms a, an, etc. do not denote a limitation of quantity, but rather denote the presence of at least one of the referenced item.

What is claimed is:

1. A method for monitoring aircraft operation status comprising the steps of:
    transmitting aircraft operation data from an on-board monitoring system of an aircraft while in a cruising phase of flight in at least one of a continuous transmission and a batched transmission while in flight, the form of the aircraft operation data being responsive to at least one of phase of flight, network traffic across a communication device associated with the aircraft, or network traffic across a network associated with the aircraft;
    receiving aircraft operation data from the aircraft in flight;
    identifying the aircraft associated with the aircraft operation data; and
    recording the aircraft operation data to an aircraft database.

2. The method according to claim 1 further comprising the step of determining whether to transmit the aircraft operation data to an additional aircraft database.

3. The method according to claim 1 further comprising the steps of:
    determining whether to transmit the aircraft operation data to a user computerized device; and
    upon determining to transmit the aircraft operation data, transmitting the aircraft operation data to the user computerized device.

4. The method according to claim 3 wherein the aircraft operation data is transmitted in real-time to the user computerized device.

5. The method according to claim 3 wherein a user of the user computerized device is associated with at least one of an aircraft owner, an aircraft operator, a flight operations center, a maintenance organization, a regulatory agency, a government agency, an engine original equipment manufacturer (OEM), an aircraft OEM, and an avionics OEM.

6. The method according to claim 1 further comprising the step of identifying the types of data comprised by the aircraft operation data.

7. The method according to claim 1 wherein the aircraft operation data comprises at least one of take-off time, take-off location, landing time, landing location, speed, heading, altitude, flight time, engine operation time, engine operating parameters, landing gear position, landing gear cycles, hull pressurization, and fuel status.

8. The method according to claim 1 wherein the aircraft operation data comprises at least one of out time and in time.

9. A system for aircraft flight and maintenance monitoring comprising:
    an on-board monitoring system operable to transmit aircraft operation data in at least one of a continuous transmission and a batched transmission from the aircraft while in a cruising phase of flight; and
    a terrestrial computerized device comprising processing circuitry, a non-transitory memory, and a communication device;
    wherein the terrestrial computerized device is positioned in communication with an on-board monitoring system of an aircraft via the communication device; and
    wherein the on-board monitoring device is configured to transmit aircraft operation data in the form of at least one of the continuous transmission and the batched transmission responsive to at least one of phase of flight, network traffic across a communication device associated with the aircraft, or network traffic across a network associated with the aircraft, and record the aircraft operation data to the aircraft database.

10. The system according to claim 9 wherein the aircraft database is accessible by a user computerized device.

11. The system according to claim 9 wherein the terrestrial computerized device is configured to transmit the aircraft operation data to at least one of an additional aircraft database and a user computerized device.

12. A method for monitoring aircraft operation status comprising the steps of:
    transmitting aircraft operation data in at least one of a continuous transmission and a batched transmission from an on-board monitoring system of an aircraft while in a cruising phase of flight, wherein the transmitting responsively selects one of the continuous transmission and batched transmission in response to one or more factors;
    receiving aircraft operation data in the form of at least one of the continuous transmission and the batched transmission from the aircraft in flight at a terrestrial computerized device;
    identifying the aircraft associated with the aircraft operation data; and
    recording the aircraft operation data to an aircraft database.

13. The method of claim 12 wherein the one or more factors include one or more selected from a group consisting of phase of flight, time of day, network traffic across a communication device, and network traffic across any of a satellite network, a terrestrial cellular network, and a radio network.

14. The method of claim 12 further comprising determining whether to transmit the aircraft operation data to an additional aircraft database.

15. The method of claim 12 further comprising identifying types of data comprised by the aircraft operation data.

16. The method of claim 12 further comprising:
    determining whether to transmit the aircraft operation data to a user computerized device; and
    upon determining to transmit the aircraft operation data, transmitting the aircraft operation data to the user computerized device.

17. The method of claim 12 further comprising:
    determining whether the aircraft operation data complies with rules governing aircraft operation;
    upon determining the aircraft operation data complies with the rules governing aircraft operation, recording the compliance to the aircraft database; and
    upon determining the aircraft operation data comprises a non-compliance, identifying a non-compliant aircraft system or component associated with the non-compliance, recording the non-compliance to the aircraft database, and performing an action responsive to the non-compliance.

* * * * *